United States Patent [19]

Carr et al.

[11] Patent Number: 4,556,745

[45] Date of Patent: Dec. 3, 1985

[54] LIQUID CRYSTAL COMPOUNDS

[75] Inventors: Neil Carr, Hull; George W. Gray, Cottingham, both of England

[73] Assignee: The Secretary of State for Defence in Her Britannic Majesty's Government of the United Kingdom of Great Britain and Northern Ireland, London, England

[21] Appl. No.: 592,757

[22] Filed: Mar. 26, 1984

Related U.S. Application Data

[63] Continuation of Ser. No. 348,261, Feb. 12, 1982, abandoned.

[30] Foreign Application Priority Data

Feb. 13, 1981 [GB] United Kingdom ................ 8104527

[51] Int. Cl.$^4$ ...................... C07C 43/20; C07C 69/00; C07C 69/96; C07C 67/02; C07C 121/60; C07C 13/615

[52] U.S. Cl. ................................. 568/632; 350/350 R; 350/346; 252/299.62; 252/299.63; 252/299.6; 252/299.1; 260/463; 260/465 C; 260/465 D; 260/465 F; 260/464; 560/138; 560/256; 568/634; 570/129; 585/22

[58] Field of Search .................. 260/464, 463, 465 C, 260/465 D, 465 F; 252/299.61, 299.62, 299.63, 299.66, 299.67, 299.5, 299.6; 560/138, 256; 568/632, 634; 570/129; 585/22; 350/350 R, 346

[56] References Cited

U.S. PATENT DOCUMENTS

| | | |
|---|---|---|
| 3,819,531 | 6/1974 | Saeva et al. ................ 252/299.63 X |
| 4,011,173 | 3/1977 | Steinstrasser .................... 252/299.5 |
| 4,035,056 | 7/1977 | Coates et al. .................... 350/350 R |
| 4,083,797 | 4/1978 | Oh ..................................... 252/299.67 |
| 4,137,192 | 1/1979 | Matsufuji ....................... 252/299.66 |
| 4,147,651 | 4/1979 | Oh ..................................... 252/299.66 |
| 4,149,413 | 4/1979 | Gray et al. ................. 252/299.67 X |
| 4,181,625 | 1/1980 | Eidenschink et al. ......... 252/299.63 |
| 4,229,315 | 10/1980 | Krause et al. .................. 252/299.63 |
| 4,261,651 | 4/1981 | Gray et al. ...................... 252/299.63 |
| 4,293,434 | 10/1981 | Deutscher et al. ............. 252/299.63 |
| 4,328,116 | 5/1982 | Harrison ........................ 252/299.66 |
| 4,368,135 | 1/1983 | Osman ............................ 252/299.63 |
| 4,372,871 | 2/1983 | Toriyama et al. ............... 252/299.5 |
| 4,400,061 | 8/1983 | Carr et al. ...................... 252/299.63 |
| 4,400,293 | 8/1983 | Romer et al. ................... 252/299.63 |
| 4,431,853 | 2/1984 | Sato et al. ....................... 252/299.63 |
| 4,439,015 | 3/1984 | Rich et al. ................... 252/299.63 X |
| 4,455,443 | 6/1984 | Takatsu et al. ............ 252/299.63 X |
| 4,482,472 | 11/1984 | Carr et al. .................. 252/299.61 X |

FOREIGN PATENT DOCUMENTS

| | | |
|---|---|---|
| 58512 | 2/1981 | European Pat. Off. ........ 252/299.63 |
| 0056113 | 7/1982 | European Pat. Off. ........ 252/299.63 |
| 58981 | 9/1982 | European Pat. Off. ........ 252/299.63 |
| 3148148 | 7/1982 | Fed. Rep. of Germany ........................ 252/299.63 |
| 2017742 | 10/1979 | United Kingdom ........... 252/299.63 |
| 2023136 | 12/1979 | United Kingdom . |
| 2031010 | 4/1980 | United Kingdom . |
| 2071131 | 9/1981 | United Kingdom . |
| 2082179 | 3/1982 | United Kingdom ........... 252/299.62 |
| 2084576 | 4/1982 | United Kingdom ........... 252/299.62 |
| 2086385 | 5/1982 | United Kingdom ........... 252/299.63 |
| 2092146 | 8/1982 | United Kingdom ........... 252/299.01 |
| 2092169 | 8/1982 | United Kingdom ........... 252/299.61 |

OTHER PUBLICATIONS

Praefcke et al., "Di-(trans-4-Alkylcyclohexyl)ethane . . ." Chemiker-Zeitung, 104, Jahrgang (1980), Nr. 9.

Gray and Kelly, "The Liquid Crystal Properties . . ." Mol Cryst Liq Cryst 1981, vol. 75, pp. 95-108.

Gray et al., "Synthesis and Liquid Crystal Properties of Some Laterally Fluorinated . . ." Mol Cryst Liq Cryst 1981, vol. 67, pp. 1-24.

Gray, "Comments on Some Recent Developments in the Field . . .", Mol. Cryst Liq. Cryst. 1981, vol. 63, pp. 3-18.

Demus et al., "Synthesis and Properties . . .", Mol. Cryst. Liq. Cryst., 1981, vol. 63, pp. 129-144, from 8th Int'l, Liq. Cryst. Conference Proceedings, Jun. 30-Jul. 4, 1980.

Gray et al., "Liquid Crystal Compounds . . .", Mol. Cryst. Liq. Cryst., 1979, vol. 53, pp. 147-166.

Primary Examiner—Teddy S. Gron
Assistant Examiner—Catherine S. Kilby
Attorney, Agent, or Firm—Stevens, Davis, Miller & Mosher (See next page for Abstract.)

[57] ABSTRACT

A liquid crystal composition includes at least one compound of Formula (I) as follows:

A—CH$_2$.CH$_2$—B      Formula (I)

where A and B are substituted ring structures which include terminal alkyl groups, A being selected from:

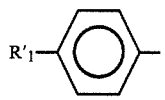

where R'$_1$ is an alkyl group R$_1$, an alkoxy group R$_1$O, an alkylcarbonyloxy group R$_1$CO.O or an alkoxycarbonyloxy group R$_1$OCO.O;

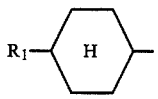

where R$_1$ is an alkyl group; or

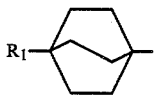

where R$_1$ is an alkyl group; and B being selected from:

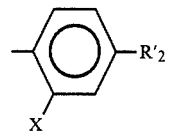

where R'$_2$ is an alkyl group R$_2$, an alkoxy group OR$_2$, an alkylcarbonyloxy group OCO.R$_2$ or an alkoxycarbonyloxy group OCO.OR'$_2$; and X is hydrogen or a cyano group or a methyl group or a halogen;

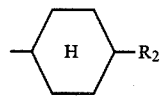

where R$_2$ is an alkyl group; or

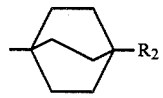

where R$_2$ is an alkyl group;

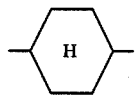

being a trans-1,4-disubstituted cyclohexane ring and

a 1,4-disubstituted bicyclo(2,2,2)octane ring.

13 Claims, 7 Drawing Figures

LIQUID CRYSTAL COMPOUNDS

This application is a continuation of Application Ser. No. 348,261, filed 2/12/82, now abandoned.

The present invention relates to liquid crystal compounds exhibiting a small (negative or positive) dielectric anisotropy and liquid crystal materials and devices incorporating such compounds.

The use of liquid crystal materials to exhibit electro-optic effects in display devices such as digital calculators or watches is now well known. One of the parameters of a liquid crystal material which is important in relation to electro-optical operation is the dielectric anisotropy ($\Delta\epsilon$) of the material. This is the difference, for a given frequency and temperature between the average dielectric constant measured parallel ($\epsilon_{11}$) to the molecules of the material, eg when aligned together, less the average dielectric constant measured perpendicular ($\epsilon_1$) to the molecules.

The sign and magnitude of the dielectric anisotropy of a given liquid crystal material is one of the major parameters which determine the kinds of electro-optic devices in which that material may be used.

For example, materials having a positive dielectric anisotropy, herein referred to as 'positive' materials, eg mixtures of 4-alkyl-or-alkoxy-4'-cyanobiphenyls and a 4-alkyl -4'''-cyano-p-terphenyl may be used in known twisted nematic effect devices (if nematic) or known cholesteric-to-nematic phase change effect devices (if cholesteric) in which the molecular arrangement is changed from the focal conic to the hemeotropic texture.

Materials having a negative dielectric anisotropy herein referred to as 'negative' materials (of suitable resistivity) may be used in known dynamic scattering effect devices (if nematic) or cholesteric memory mode devices (if cholesteric).

Materials having a small dielectric anisotropy (negative or positive), may also be mixed with those having a large positive or negative dielectric anisotropy to produce mixtures whose overall dielectric anisotropy is positive or negative as appropriate (but reduced in magnitude). An example where this is done is in the preparation of mixture compositions for multiplexed twisted nematic effect devices where benzoate esters of the form:

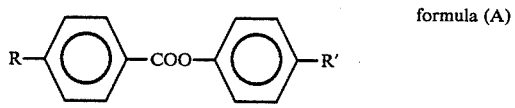

formula (A)

where R, R'=alkyl or alkoxy, are added to cyanobiphenyls and other compounds of high positive dielectric anisotropy as described for example in UK Patent Specification No. 2031010A.

The response time, ie the times required to switch on and switch off a liquid crystal electro-optical device are determined largely by the viscosity coefficients of the liquid crystal material used in the device, principally the 'aligned flow' viscosity coefficient (see for example the article entitled "Flow aligned viscosities of cyanobiphenyls" by J. Constant and E. P. Raynes). Mol Cryst. Liq. Cryst. 1980.

The term 'viscosity' as used hereinafter is to be understood to mean the aligned flow coefficient in the nematic mesophase.

The viscosity of a liquid crystal material which is a mixture of liquid crystal compounds is dependent on the viscosity of the individual compounds forming the mixture. Thus, in the case of mixtures which are compositions for multiplexed twisted nematic effect devices the viscosity is dependent partly on the viscosity of the esters of formula (A) above. Such esters have a viscosity of between about 20 and 70 cSt (real or extrapolated values) at 20° C. in the nematic mesophase depending on the terminal groups in the ester structure.

One purpose of the present invention is to provide materials including members of a novel family of compounds of low dielectric anisotropy for which lower viscosity values are possible than for the esters of formula (A) above and which may be used partly or wholly in place of the esters of formula (A) in liquid crystalline mixtures for multiplexed twisted nematic effect devices as well as other applications.

According to the present invention a liquid crystal composition suitable for use in an electro-optical display comprises a mixture of Components A, B and C as follows:

Component A: a low melting positive nematic component forming between 20% and 80% by weight of said composition and comprising one or more nematic compounds of high positive dielectric anisotropy, said material exhibiting a nematic liquid crystalline phase at 20° C.;

Component B: a high clearing component forming between 20% and 80% by weight of said composition and being material having a clearing point not less than 80° C.; and Component C: a component of low dielectric anisotropy forming between 5% and 30% by weight of said composition; the total percentage by weight of components A, B and C being 100%, and wherein Component C comprises at least one compound of Formula (I) as follows:

$$A-CH_2.CH_2-B \qquad \text{Formula (I)}$$

where A and B are substituted ring structures which include terminal alkyl groups, A being selected from:

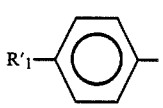

where $R'_1$ is an alkyl group $R_1$, an alkoxy group $R_1O$, an alkylcarbonyloxy group $R_1CO.O$ or an alkoxycarbonyloxy group $R_1OCO.O$;

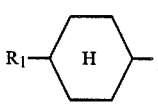

where $R_1$ is an alkyl group; or

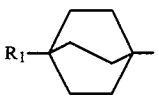

where $R_1$ is an alkyl group; and B being selected from:

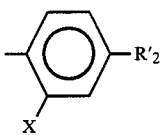

wherein $R'_2$ is an alkyl group $R_2$, an alkoxy group $OR_2$, an alkylcarbonyloxy group $OCO.R_2$ or an alkoxycarbonyloxy group $OCO.OR'_2$; and X is hydrogen or a cyano group or a methyl group or a halogen;

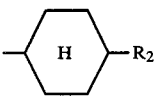

where $R_2$ is an alkyl group; or

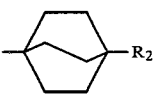

where $R_2$ is an alkyl group;

being a trans-1,4-disubstituted cyclohexane ring. and

a 1,4-disubstituted bicyclo(2,2,2)octane ring.

The alkyl groups $R_1$ and $R_2$ in Formula (I) preferably contain eighteen or less carbon atoms, desirable ten or less carbon atoms. These groups may be normal or branched. If branched, one or both of the two alkyl groups in the structure may contain a chiral centre in which case the compound may be optically active. If both of the alkyl groups in the structure are normal or not chiral groups then the compound is nematogenic.

Preferably if X is not H it is fluorine.

Compounds of Formula (I) may be selected from the either of the following two categories:
(i) compounds which normally exhibit a liquid crystal phase;
(ii) compounds which do not normally exhibit a liquid crystal phase but which nevertheless usefully affect some aspect of liquid crystal behaviour when dissolved in other liquid crystal compounds.

Compounds in category (ii) show a 'monotropic' or a 'virtual' liquid crystal to isotropic liquid transition at a temperature below the melting point of their solid phase. The monotropic or virtual transition may be detected respectively by rapid cooling of the liquid phase or by dissolving the compound in a material exhibiting a liquid crystal phase, observing the change in the transition to the isotropic liquid phase of the material by the addition and calculating the virtual transition temperature by extrapolation.

Compounds in category (ii) can for example be usefully dissolved in other liquid crystal compounds to extend or vary the liquid crystal temperature ranges of the compounds or to vary the molecular helical pitch (in the case of cholesteric liquid crystals).

The preferred structure for Formula (I) compounds is:

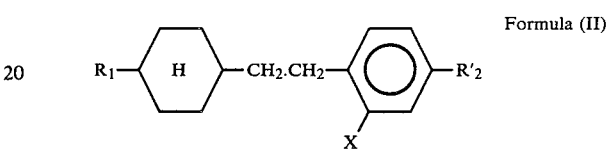

Formula (II)

Within this structure special mention should be made of compounds of the form:

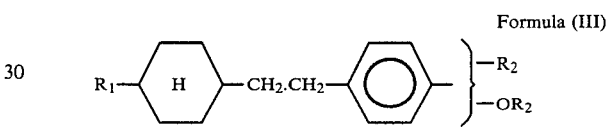

Formula (III)

Examples of compounds having formula (III) have been found to show viscosity values lower than those of the esters of formula (A) having similar terminal groups.

For example, the compound having the structure:

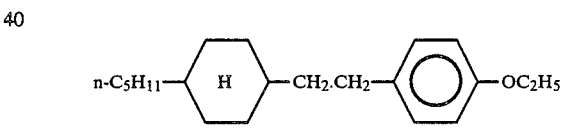

has a viscosity of 13 cSt at 20° C. This compound also advantageously has a wide nematic liquid crystal phase from 18° C. (melting point) to 46.5° C. (clearing point); cf the compounds

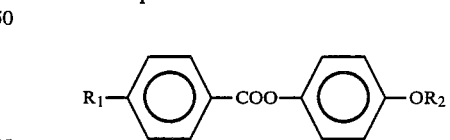

which have viscosities of about 60 cSt at 20° C.

The compounds of formula (I) may be prepared by routes in which the individual procedures involved are known (the overall routes being new).

For example, the following routes may be used:

Route (1): A—CH₂COOH ⟶ A—CH₂COCl ⟶

-continued

Route (2): A—CH$_2$COOH ⟶ A—CH$_2$COCl ⟶

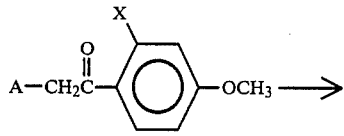

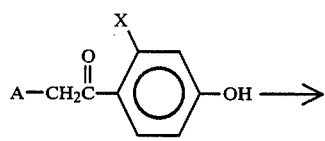

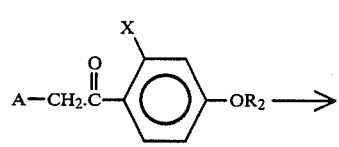

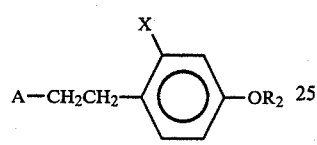

Route (3): A—CH$_2$COOH ⟶ A—CHO ⟶

A—CH=CH—B ⟶ A—CH$_2$CH$_2$—B

Route (4): A—Br ⟶ A—CH$_2$CH$_2$—Br ⟶

A—CH$_2$CH$_2$—B where A, B, X and R$_2$ are as defined for formula (I) above.

As can be seen above it is compounds for which

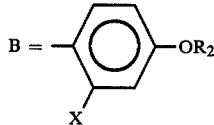

which may be made by Route (2).

Route (3) is preferably used for compounds for which

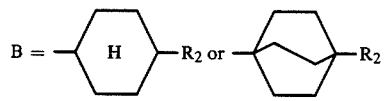

Route (4) is preferably used for compounds for which

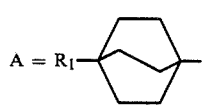

Materials embodying the present invention may be used in any of the following applications:

(i) for use in twisted nematic effect devices particularly multiplexed devices; an example of such a device is given below;
(ii) in Fréedericksz effect devices in which the molecular arrangement may be changed from the homogeneous texture (OFF state) to the homeotropic texture (ON state) by an electric field;
(iii) mixed together with an optically active (chiral) additive to give an overall positive material which is a long pitch (typically 1–2 μm) cholesteric, preferably together also with a pleochroic dye, in cholesteric-to-nematic phase change effect devices in which the molecular arrangement may be changed from a scattering focal conic texture (OFF state) to a clear homeotropic texture (ON state) by an electric field; the material embodying the intention will normally form at least 90%, probably about 95–96% by weight of the overall mixture depending on the molecular helical pitch of the chiral additive (which forms the remainder of the mixture).
(iv) in two frequency switching effect devices in which the dielectric anisotropy of the material may be changed from (at low frequency) positive (OFF state) to negative (ON state) by the application of a high frequency electric field.

The construction and operation of the above devices and the general kinds of material which are suitable for use in them are themselves known.

It will be apparent to those skilled in the art that in the above applications where mixtures are formed these mixtures can have the value and sign of their dielectric anisotropy controlled as required by control of the proportions of the materials blended together to form them.

Where a material is added to one or more compounds according to Formula (I) the material may itself be a mixture of two or more compounds.

Mixtures may be formed in a known way, eg simply by heating the constituent compounds to form an overall isotropic liquid, stirring the liquid and allowing it to cool.

The compounds according to Formula (I) may usefully reduce response times in the above applications as well as reduce postivity of the dielectric anisotropy; this may usefully affect other properties, eg multiplexibility in twisted nematic effect devices or switching frequency in two-frequency switching effect devices.

In the composition according to the present invention Component A preferably includes on or more 4-alkyl-or 4-alkyl-4'-cyanobiphenyls, preferably wherein the alkyl or akoxy group is a straight-chained group having from 1 to 12 carbon atoms inclusive.

Component A may however include one or more compounds selected from the following families:

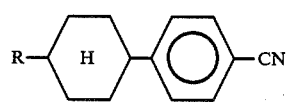

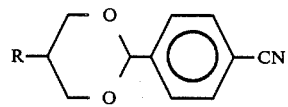

-continued

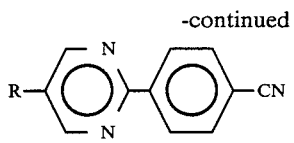

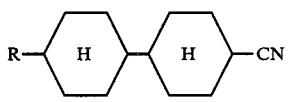

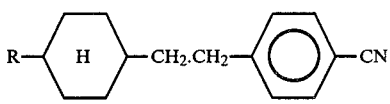

where R is an alkyl group, preferably n-alkyl containing 1 to 12 carbon atoms. Preferably the cyano-biphenyl(s) constitute at least 50% by weight of Component A.

Component B may include one or more compounds selected from the following families (where R=alkyl-:—preferably n-alkyl containing from 1 to 12 carbon atoms):

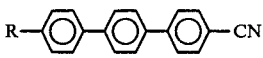

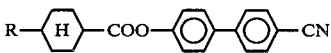

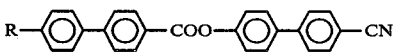

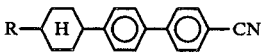

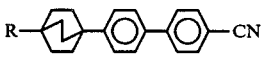

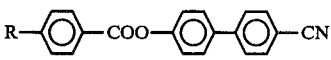

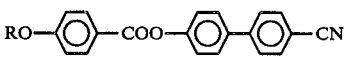

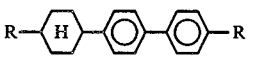

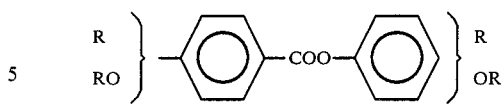

each R being independently selected and being preferably n-alkyl having from 1 to 12 carbon atoms.

Component C may include, in addition to one or more compounds of Formula (I), which preferably comprise at least 30% by weight of Component C, one or more compounds selected from the following families

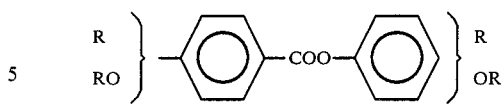

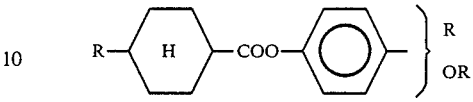

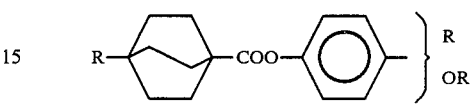

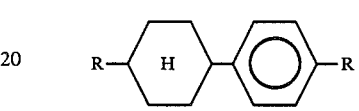

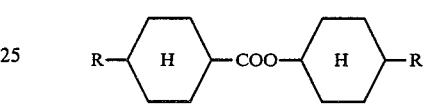

or an analogue of one or more of the compounds of Formulae (IX) to (XI) in which the 2 or 3 position of the right hand 1,4 disubstituted benzene ring as shown (where a benzene ring is included) carries a fluorine substituent. Each R is independently alkyl, preferably n-alkyl having from 1 to 12 carbon atoms.

Preferably Component A contains between 30% and 70% by weight of the composition and Component B contains between 15% and 25% by weight of the composition.

Preferably each 4-alkyl- or 4-alkoxy-4'-cyanobiphenyl incorporated in the mixture has seven or less carbon atoms in its alkoxy or alkyl group. Preferably this number of carbon atoms is odd when the group is an alkoxy group and is even when the group is an alkyl group.

To provide more general examples of a mixture embodying the present invention a compound of Formula (I) above may be mixed together with any of the compounds in the following known families to give a composition as specified above for use in one or more of the applications given above (the actual application depending on the mixture's properties):

i

ii

iii

-continued

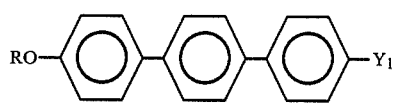   iv

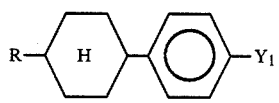   v

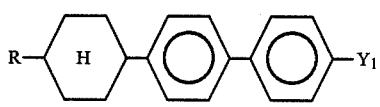   vi

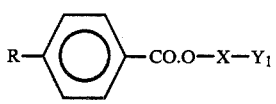   vii

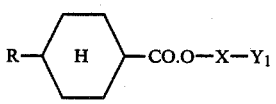   viii

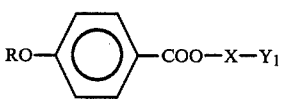   ix

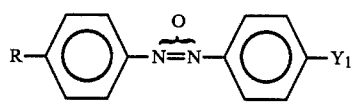   x

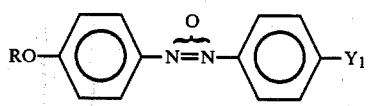   xi

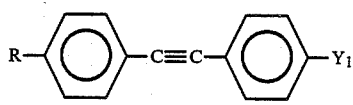   xii

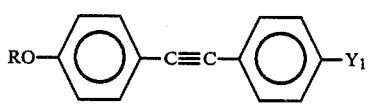   xiii

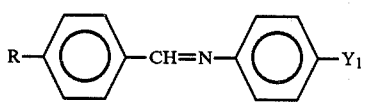   xiv

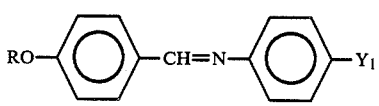   xv

   xvi

-continued

R—◯—◯—COO—X—Y₁   xvii

RO—◯—◯—COO—X—Y₁   xviii

R—[bicyclooctane]—COOX—Y₁   xix

R—H—CH₂O—◯—Y₁   xx

R—[bicyclooctane]—CH₂O—◯—R'   xxi

R—[bicyclooctane]—CH₂O—◯—OR'   xxii

[dioxane]—◯—CN   xxiii

R—[pyrimidine]—◯—CN   xxiv wherein

is a trans-1,4-disubstituted cyclohexane ring,

is a 1,4-disubstituted bicyclo(2,2,2)octane ring, x is a 1,4 phenylene group

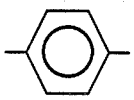

or a 4,4' biphenylyl group

or a 2,6 naphthyl group

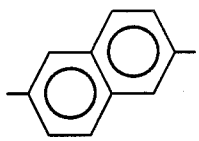

and $Y_1$ is CN, or R' or CO.O—X—$Y^1$ where $Y^1$ is CN, or R' or OR'; where R and R' are alkyl groups, or a derivative of one of these wherein H is replaced by a halogen, eg F, in one of the benzene rings.

According to the present invention in another aspect a liquid crystal device includes two dielectric substrates at least one of which is optically transparent, a layer of liquid crystal material sandwiched between the substrates and electrodes on the inner surfaces of the substrates to enable an electric field to be applied across the layer of liquid crystal material to provide an electro-optic effect therein, characterised in that the liquid crystal material consists of or includes a compound according to formula (I) above.

The device according to the third aspect may be a twisted nematic effect device, which may or may not be operated in a multiplexed fashion, a cholesteric-to-nematic phase change effect device, a Fréedericksz effect device or a two-frequency switching effect device all constructed in a known manner or any of the other devices mentioned above. The various ways in which compounds according to formula (I) may be used in these devices are outlined above and will be further apparent to those skilled in the art.

Examples of the preparation and properties of compounds having formula (I) will now be given. The symbols used in the Examples have the followng meanings:
C=crystalline solid.
N=nematic liquid crystal.
$S_A$=smectic A liquid crystal.
$S_B$=smectic B liquid crystal.
A=isotropic liquid.
C-N etc=transition temperature (eg in the case of C-N for the crystalline solid to nematic transition).
round brackets ( ) around a temperature value indicate a monotropic transition.
square brackets [ ] around a temperature value indicate a virtual transition.
mp=melting point.
bp=boiling point.

EXAMPLE 1

This example describes the preparation of 1-(4'-alkylphenyl)-2-(4''-alkylphenyl)ethanes, and 1-(4'-alkyl-2'-fluorophenyl)-2-(4''-alkylphenyl)ethanes by the following route:

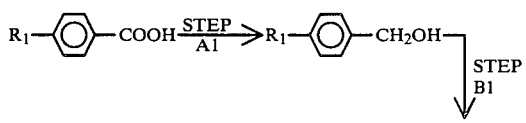

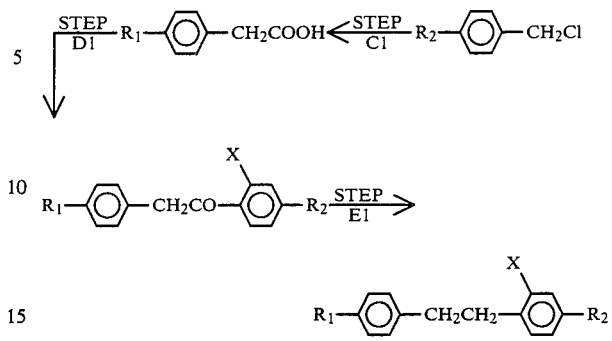

where $R_1$ and $R_2$ are alkyl groups as defined above and X is hydrogen or fluorine.

Step A1

The production of 4-alkylbenzyl alcohols from the known 4-alkylbenzoic acids.

This step may be carried out essentially by the same method as described in Step A1 in UK Patent Application No. 8003129 (see also the article by H. D. Holtz and L. M. Stock in J. Amer. Chem. Soc., 92 1582 (1970)) which uses the trans-4-alkylcyclohexane-1-carboxylic acids as starting materials. Basically the acid is added to an excess of thionyl chloride to form the acid chloride, which is then added to lithium aluminium hydride in ether followed by water and sulphuric acid to form the corresponding alcohol.

An example of such a product is 4-n-pentylbenzyl alcohol, yield 90%, bp 105° C. at 1 mm Hg.

Step B1

The production of 4-alkylbenzyl chloride form 4-alkylbenzyl alcohols.

The 4-Alkylbenzyl alcohol (0.02 mole) is added to a solution of chloroform (60 cm³) and thionyl chloride (2.86 g) and the mixture heated for 90 min. at 80° C. The solvent is removed in vacuo and the residual oil is taken up in ether (50 cm³). The solution is washed with 10% aqueous sodium bicarbonate (2×30 cm³), dried ($Na_2SO_4$), and the solvent removed in vacuo. The residual product is purified by distillation.

An example of such a product is 4-n-pentylbenzyl chloride, yield 95%, bp 120° C. at 2 mm Hg.

Step C1

The production of 4-alkylphenylacetic acids from 4-alkylbenzyl chlorides.

This step may be carried out essentially by a standard Grignard carbonation method as described in the literature. See for example the article by G. W. Gray and D. G. McDonnell in Mol. Cryst. Liq. Cryst., 53, 164 (1979).

Step D1

The production of 4-alkylbenzyl 4-alkylphenyl ketones and 4-alkylbenzyl 4-alkyl-2-fluorophenyl ketones from 4-alkylphenylacetic acids.

This step may be carried out essentially by the method for Friedel-Crafts acylation using the appropriate 4-alkylphenylacetyl chloride (prepared from the acid in a conventional way eg using an excess of thionyl chloride) and the appropriate alkylbenzene or 1-alkyl-3- fluorobenzene as described in the literature—see for example the article by D. Coates and G. W. Gray in J. Chem. Soc. Perkin II, 867 (1976) in which the use of 4-bromobiphenyl and 4-n-alkoxyphenylacetyl chloride is described.

Step E1

The production of 1-(4'-alkylphenyl)-2-(4"-alkylphenyl)ethanes and 1-(4'-alkyl-2'-fluorophenyl)-2-(4"-alkylphenyl)ethanes from 4-alkylphenyl 4-alkylphenyl ketones and 4-alkylbenzyl 4-alkyl-2-fluorophenyl ketones respectively.

This step may be carried out essentially by one of the methods described in the literature for reduction of a carbonyl function to a hydrocarbon—see for example the article by D. Coates and G. W. Gray in J. Chem. Soc. Perkin II,867 (1976) in which the use of 4-(4"-n-alkoxyphenylacetyl)-4'-bromobiphenyls is described.

An example of such a product is

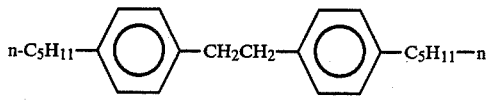

This compound has the following properties C-I=42° C.; N-I=[−44° C.]. From viscosity measurements on the isotropic liquid extrapolated viscosities of 28 cP at 0° C. and 16 cP at 20° C. were obtained.

EXAMPLE 2

This example describes the preapration of 1-(trans-4'-alkylcyclohexyl)-2-(4"-alkylphenyl)ethanes and 1-(trans-4'-alkylcyclohexyl)-2-(4"-alkyl-2"-fluorophenyl)ethanes by the following route:

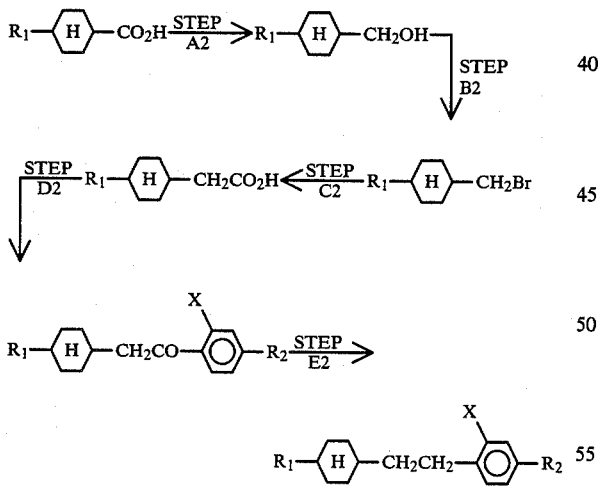

where $R_1$ and $R_2$ are alkyl groups and X is hydrogen or fluorine.

Step A2

The production of trans-4-alkylcyclohexylmethanols from the known trans-4-alkylcyclohexane-1-carboxylic acids.

This Step is identical to Step A1 described in Patent Application No. 8003129 (see also Step A1 above).

An example of such a product is trans-4-propylcyclohexylmethanol, yield 89%, bp 155° C. at 3 mm Hg.

Step B2

The production of trans-4-alkylcyclohexylmethyl bromides from trans-4-alkylcyclohexylmethanols.

This step is identical to step B1 described in Patent Application No. 8003129. Basically, the alcohol produced in Step A1 above is added to aqueous hydrobromic acid and concentrated sulphuric acid and the whole is refluxed together and extracted using ether.

An example of such a product is trans-4-n-propylcyclohexylmethyl bromide, yield 82%, bp 155° C. at 15 mm Hg.

Step C2

The production of trans-4-alkylcyclohexylacetic acids from trans-4-alkylcyclohexylmethyl bromides.

This Step may be carried out essentially by the same procedure as given in Step C1 above, (using in that Step 4-alkylbenzyl chlorides as starting materials).

An example of such a product is trans-4-n-pentylcyclohexylacetic acid, yield 42%, mp 58° C.

Step D2

The production of trans-4-alkylcyclohexylmethyl 4-alkylphenyl ketones and trans-4-alkylcyclohexylmethyl 4-alkyl-2-fluorophenyl ketones from trans-4-alkylcyclohexylacetyl chlorides.

This step may be carried out essentially by the method given in Step D1 above (which uses 4-alkylphenylacetic acids as starting materials).

Step E2

The production of 1-(trans-4'-alkylcyclohexyl)-2-(4"-alkylphenyl)ethanes and 1-(trans-4'-alkylcyclohexyl)-2-(4"-alkyl-2"-fluorophenyl)ethanes from trans-4-alkylcyclohexylmethyl 4-alkylphenyl ketones and trans-4-alkylcyclohexylmethyl 4-alkyl-2-fluorophenyl ketones respectively.

This Step may be carried out essentially by the method given in Step E1 above, (which uses 4-alkylbenzyl 4-alkylphenyl ketones and 4-alkylbenzyl 4-alkyl-2-fluorophenyl ketones as starting materials). Examples of such products are:

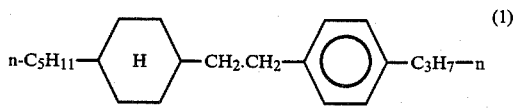

(1)

This compound has the following properties: C-$S_B$=3° C.; $S_B$-I=16° C.; N-I=[3° C.]; viscosity at 20° C.=22 cSt.

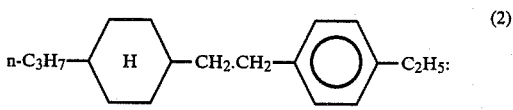

(2)

N-I=[−28° C.], viscosity (nematic) extrapolated from values obtained with a 20% by weight solution in ZLI 1132*=3 cp at 20° C.
* supplied by E. Merck Co.

EXAMPLE 3

This example describes the preparation of 1-(4'-alkylbicyclo(2',2',2')octyl)-2-(4"'-alkylphenyl)ethanes and 1-(4'-alkylbicyclo(2',2',2')octyl)-2-(4"-alkyl-2"-fluorophenyl)ethanes by the following route:

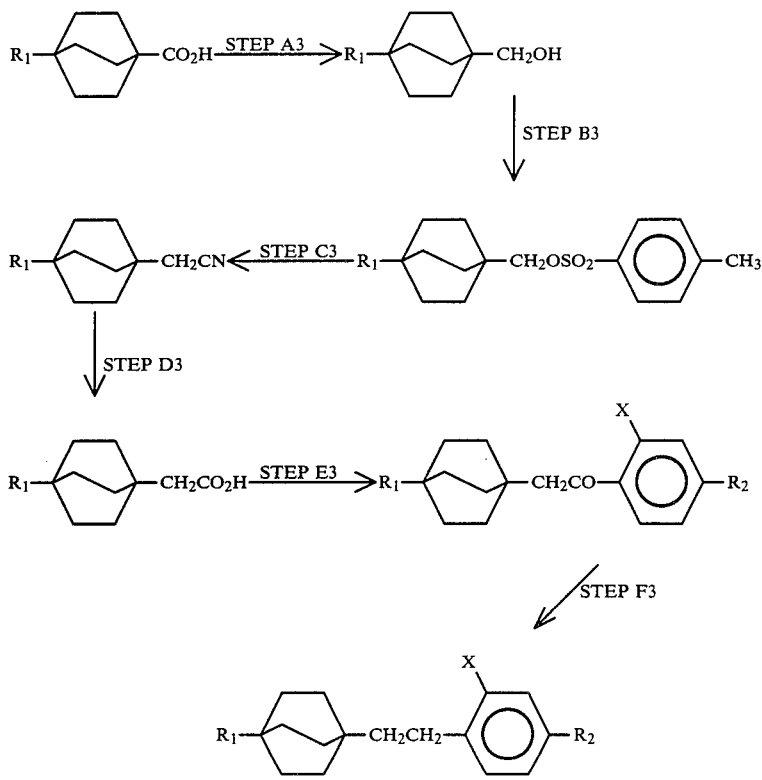

where $R_1$ and $R_2$ are alkyl groups as described above and X is hydrogen or fluorine.

Step A3

The production of 4-alkylbicyclo(2,2,2)octylmethanols from the known 4-alkylbicyclo(2,2,2)octane-1-carboxylic acids. This may for example be carried out by essentially the same method as used in Step A1 above.

An example of such a product is 4-n-pentylbicyclo(2,2,2)octylmethanol, yield 86%, bp 185° C. at 4 mm Hg.

Step B3

The production of 4-alkylbicyclo(2,2,2)octylmethyl toluene-4-sulphonates from 4-alkylbicyclo(2,2,2)octylmethanols.

This may for example be carried out by standard procedures given in the literature.

An example of such a product is 4-n-pentylbicyclo(2,2,2)octyl toluene-4-sulphonate, yield 82%, mp 67° C.

Step C3

The production of 4-alkylbicyclo(2,2,2)octylacetonitriles from 4-alkylbicyclo(2,2,2)octylmethyl toluene-4-sulphonates.

4-Alkylbicyclo(2,2,2)octylmethyl toluene-4-sulphonate (0.01 mole) is heated under reflux for 16 hr with potassium cyanide (0.012 mole) in dry dimethylformamide (40 cm$^3$).

Iron(III) chloride (2.0 g in 150 cm$^3$ water) is added to the cooled solution followed by concentrated hydrochloric acid (10 cm$^3$) at 50°-60° C. and the solution stirred for 20 min. Water (100 cm$^3$) is added and the whole is shaken with ether (3×80 cm$^3$). The combined ethereal extracts are washed with brine (2×60 cm$^3$) and dried (Na$_2$SO$_4$). The solvent is removed in vacuo and the residual oil is purified by reduced pressure distillation.

An example of such a product is 4-n-butylbicyclo(2,2,2)octylacetonitrile, yield 69%, bp 170° C. at 2 mm Hg.

Step D3

The production of 4-alkylbicyclo(2,2,2)octylacetic acids from 4-alkylbicyclo(2,2,2)acetonitriles.

A mixture of 4-alkylbicyclo(2,2,2)octylacetonitrile (0.005 mole), sulphuric acid (10 cm$^3$ of a 50% aqueous solution) and glacial acetic acid (25 cm$^3$) is heated under reflux for 24 hr. The cooled solution is poured onto ice (100 g) and the organic product extracted into ether (3×80 cm$^3$). The ethereal extracts are boiled with decolourising charcoal (2 g) and filtered whilst still hot to remove coloured impurities. The ethereal solution is dried (Na$_2$SO$_4$) and the solvent removed in vacuo. The product is crystallised from methanol using cardice as refrigerant.

Examples of such products are 4-n-butylbicyclo(2,2,-2)octylacetic acid, yield 68%, mp 85° C., and 4-n-propylbicyclo(2,2,2)octylacetic acid, yield 62%, mp 92° C.

Step E3

The production of 4-alkylbicyclo(2,2,2)octylmethyl 4-alkylphenyl ketones and 4-alkylbicyclo(2,2,2)octylmethyl 4-alkyl-2-fluorophenyl ketones from 4-alkylbicyclo(2,2,2)octylacetic acids.

This step is carried out essentially in the same way as Step D1 above (which uses 4-alkylphenylacetic acids as starting materials).

Step G3

The production of 1-(4'-alkylbicyclo(2',2',2')octyl)-2-(4''-alkylphenyl)ethanes and 1-(4'-alkylbicyclo(2',2',2-')octyl)-2-(4''-alkyl-2''-fluorophenyl)ethanes from 4-alkylbicyclo(2,2,2)octylmethyl 4-alkylphenyl ketones and 4-alkylbicyclo(2,2,2)octylmethyl 4-alkyl-2-fluorophenyl ketones respectively.

This step is carried out in the same way as Step F1 above (which uses 4-alkylbenzyl 4-alkylphenyl ketones and 4-alkylbenzyl 4-alkyl-2-fluorophenyl ketones as starting materials).

EXAMPLE 4

This example describes the preparation of 1-(4'-alkylphenyl)-2-(4''-alkoxyphenyl)ethanes, 1-(4'-alkylphenyl)-2-(4''-alkoxy-2''-fluorophenyl)ethanes, 1-(trans-4'-alkylcyclohexyl)-2-(4''-alkoxyphenyl)ethanes, 1-(trans-4'-alkylcyclohexyl)-2-(4''-alkoxy-2''-fluorophenyl)ethanes, 1-(4'-alkylbicyclo(2',2',2')octyl)-2-(4''-alkoxyphenyl)ethanes, and 1-(4'-alkylbicyclo(2',2',2')octyl)-2-(4''-alkoxy-2''-fluorophenyl)ethanes by the following route:

methyl 4-methoxyphenyl ketones, and 4-alkylbicyclo(2,2,2)octylmethyl 2-fluoro-4-methoxyphenyl ketones from 4-alkylphenylacetic acid, trans-4-alkylcyclohexylacetic acid or 4-alkylbicyclo(2,2,2)octylacetic acid as appropriate. The preparation of these acids is described in the above examples.

This step may be carried out essentially by the method given in Step D1 above. (Step D1 using 4-alkylphenylacetic acids as the starting acids.)

Step B4

The production of 1-(4'-alkylphenyl)-2-(4''-methoxyphenyl)ethanes, 1-(4'-alkylphenyl)-2-(2''-fluoro-4''-methoxyphenyl)ethanes, 1-(trans-4'-alkylcyclohexyl)-2-(4''-methoxyphenyl)ethanes, 1-(trans-4'-alkylcyclohexyl)-2-(2''-fluoro-4''-methoxyphenyl)ethanes, 1-(4'-alkylbicyclo(2',2',2')octyl)-2-(4''-methoxyphenyl)ethanes, and 1-(4'-alkylbicyclo(2',2',2')octyl)-2-(2''-fluoro-4''-methoxyphenyl)ethanes from 4-alkylbenzyl 4-methoxyphenyl ketones, 4-alkylbenzyl 2-fluoro-4-methoxyphenyl ketones, trans-4-alkylcyclohexylmethyl 4-methoxyphenyl ketones, trans-4-alkylcyclohexylmethyl 2-fluoro-4-methoxyphenyl ketones, 4-alkylbicyclo(2,2,-2)octylmethyl 4-methoxyphenyl ketones, and 4-alkylbicyclo(2,2,2)octylmethyl 2-fluoro-4-methoxyphenyl ketones respectively.

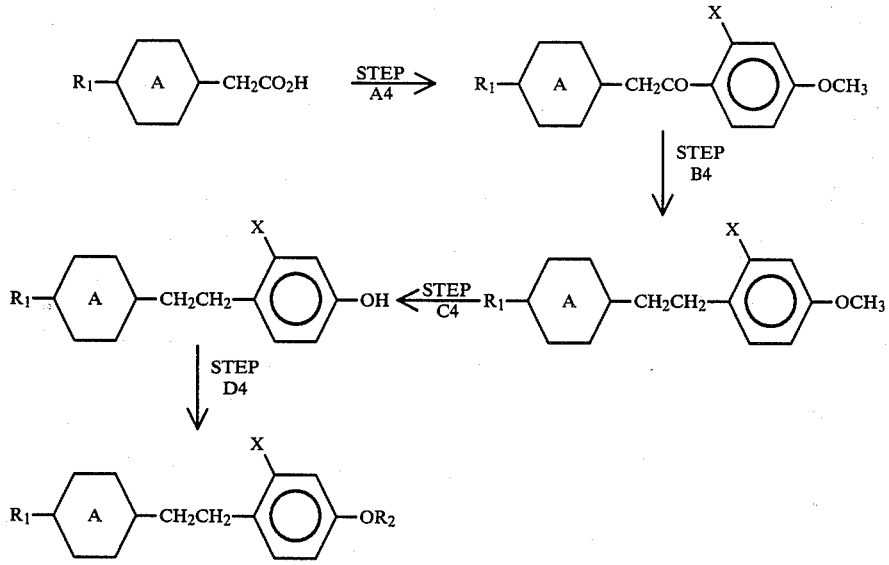

where $R_1$ and $R_2$ are alkyl groups as defined above, X is a hydrogen or a fluorine and ring

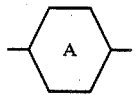

is either a 1,4-disubstituted benzene ring, a trans-1,4-disubstituted cyclohexane ring, or a 1,4-disubstituted bicyclo(2,2,2)octane ring.

Step A4

The production of 4-alkylbenzyl 4-methoxyphenyl ketones, 4-alkylbenzyl 2-fluoro-4-methoxyphenyl ketones, trans-4-alkylcyclohexylmethyl 4-methoxyphenyl ketones, trans-4-alkylcyclohexylmethyl 2-fluoro-4-methoxyphenyl ketones, 4-alkylbicyclo(2,2,2)octyl- This step may be carried out essentially by the same method as given in step E1 above.

Step C4

The production of 1-(4'-alkylphenyl)-2-(4''-hydroxyphenyl)ethanes, 1-(4'-alkylphenyl)-2-(2''-fluoro-4''-hydroxyphenyl)ethanes, 1-(trans-4'-alkylcyclohexyl)-2-(4''-hydroxyphenyl)ethanes, 1-(trans-4'-alkylcyclohexyl)-2-(2''-fluoro-4''-hydroxyphenyl)ethanes, 1-(4'-alkylbicyclo(2',2',2')octyl)-2-(4''-hydroxyphenyl)ethanes, and 1-(4'-alkylbicyclo(2',2',2')octyl)-2-(2''-fluoro-4''-hydroxyphenyl)ethanes from 1-(4'-alkylphenyl)-2-(4''-methoxyphenyl)ethanes, 1-(4'-alkylphenyl)-2-(2''-fluoro-4''-methoxyphenyl)ethanes, 1-(trans-4'-alkylcyclohexyl)-2-(4''-methoxyphenyl)ethanes, 1-(trans-4'-alkylcyclohexyl)-2-(2''-fluoro-4''-methoxyphenyl)ethanes, 1-(4'-alkylbicyclo(2',2',2')octyl)-2-(4''-methoxyphenyl)ethanes, and 1-(4'-alkylbicyclo(2',2',2')octyl)-2-(2"-fluoro-4"-methoxyphenyl)ethanes respectively.

Demethylation of the appropriate methyl ether is carried out by heating with a mixture of constant boiling hydrobromic acid and acetic acid according to conventional procedures.

Step D4

The production of 1-(4'-alkylphenyl)-2-(4"-alkoxyphenyl)ethanes, 1-(4'-alkylphenyl)-2-(4"-alkoxy-2"-fluorophenyl)ethanes, 1-(trans-4'-alkylcyclohexyl)-2-(4"-alkoxyphenyl)ethanes, 1-(trans-4'-alkylcyclohexyl)-2-(4"-alkoxy-2"-fluorophenyl)ethanes, 1-(4'-alkylbicyclo(2',2',2')octyl)-2-(4"-alkoxyphenyl)ethanes, and 1-(4'-alkylbicyclo(2',2',2')octyl)-2-(4"-alkoxy-2"-fluorophenyl)ethanes from 1-(4'-alkylphenyl)-2-(4"-hydroxyphenyl)ethanes, 1-(4'-alkylphenyl)-2-(2"-fluoro-4"-hydroxyphenyl)ethanes, 1-(trans-4'-alkylcyclohexyl)-2-(4"-hydroxyphenyl)ethanes, 1-(trans-4'-alkylcyclohexyl)-2-(2"-fluoro-4"-hydroxyphenyl)ethanes, 1-(4'-alkylbicyclo(2',2',2')octyl)-2-(4"-hydroxyphenyl)ethanes, and 1-(4'-alkylbicyclo(2',2',2')octyl)-2-(2"-fluoro-4"-hydroxyphenyl)ethanes respectively.

This step may be carried out by using a standard literature method for the alkylation of a phenol—see for example the article by D. Coates and G. W. Gray in J. Chem. Soc., Perkin II, 867 (1976).

Examples of such products are 1-(trans-4'-n-pentylcyclohexyl)-2-(4"-ethoxyphenyl)ethane, yield 74%, C-N 18° C., N-I 46.5° C., $S_B$-N (8° C.), viscosity (nematic)=13 cP at 20° C., 36 cP at 0° C., Δn at 20° C.=0.03; 1-(trans-4'-n-pentylcyclohexyl)-2-(4"-methexyphenyl)ethane, C—N=30° C., N-I=34° C.; 1-(trans-4'-n-pentylcyclohexyl)-2-(4"-n-butyloxyphenyl)ethane, C-$S_B$=26° C., $S_B$-N=44.5° C., N-I=45.5° C., and 1-(trans-4'-n-pentylcyclohexyl)-2-(4"-n-hexyphenyl)ethane, C-$S_B$=18° C., $S_B$-I=49.5° C.; and 1-(4'-n-butylbicyclo(2',2',2')octyl)-2-(4"-ethoxyphenyl)ethane, yield 51%, C-N=57° C., N-I=87° C.

EXAMPLE 5

This example describes the preparation of compounds having the structures:

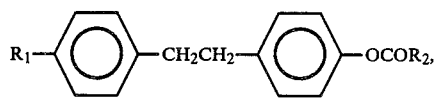

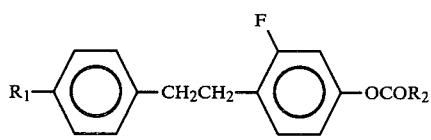

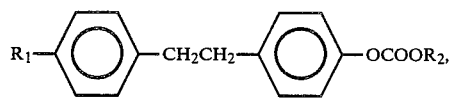

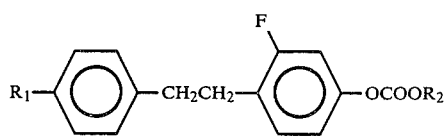

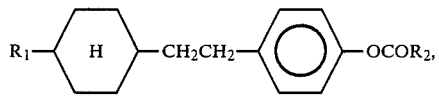

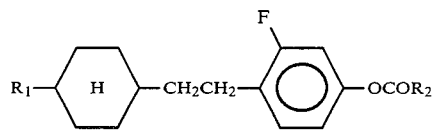

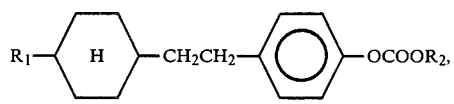

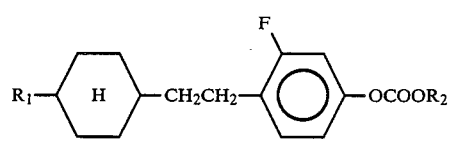

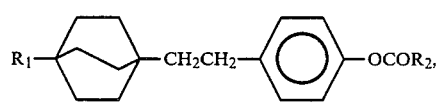

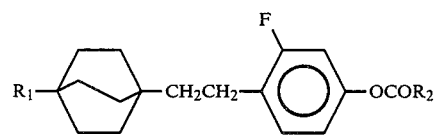

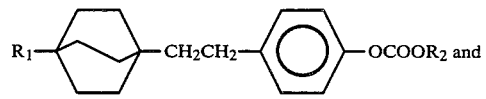

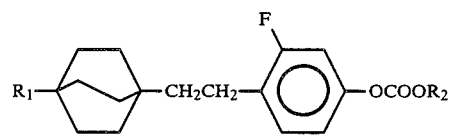

by the following route:

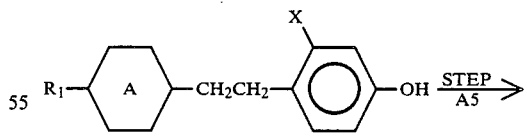

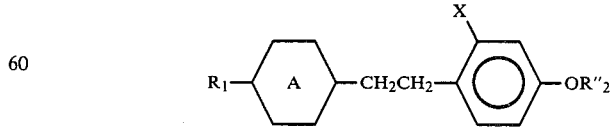

where R"₂ is either an alkylcarbonyl group (R₂CO) or an alkoxycarbonyl group (R₂OCO), R and R₂ are alkyl groups as defined above, X is either fluorine or a hydrogen and ring

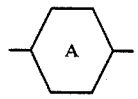

is either a 1,4-disubstituted benzene ring, a trans-1,4-disubstituted cyclohexane ring, or a 1,4-disubstituted bicyclo(2,2,2)octane ring.

Step A5

The production of compounds having the structures given above from the corresponding hydroxy compounds.

This step may be carried out using a standard literature method for the preparation of esters from the appropriate acid chloride or alkyl chloroformate and the appropriate phenol. See for example the article by G. W. Gray and D. G. McDonnell, in Mol. Cryst. Liq. Cryst., 53, 162 (1979). The phenols in this case are obtained as in Steps A4 to C4 above.

EXAMPLE 6

This example describes the preparation of 1-(trans-4'-alkylcyclohexyl)-2-(trans-4"-alkylcyclohexyl)ethanes and 1-(4'-alkylbicyclo(2',2',2')octyl)-2-(trans-4"-alkylcyclohexyl)ethanes by the following route:

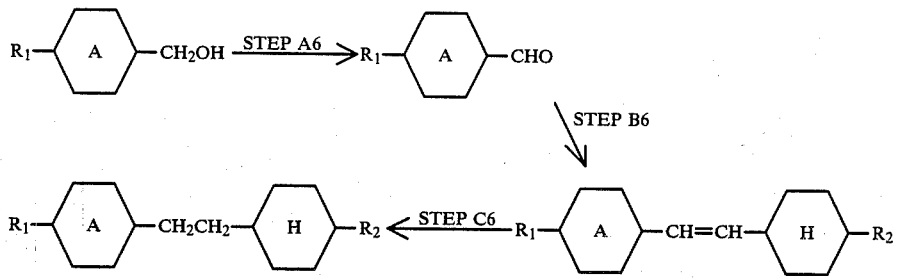

where $R_1$ and $R_2$ are alkyl groups as defined above and ring

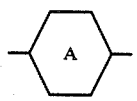

is either a trans-1,4-disubstituted cyclohexane ring or a 1,4-disubstituted bicyclo(2,2,2)octane ring.

Step A6

The production of 4-alkylcyclohexylformaldehyde and 4-alkylbicyclo(2,2,2)octylformaldehyde from 4-alkylcyclohexylmethanols and 4-alkylbicyclo(2,2,2)octyl methanols respectively. The preparation of these starting alcohols is given in steps A2 and A3 respectively.

This step may be carried out using a standard literature method for the controlled oxidation of an alcohol to an aldehyde—see for example A. I. Vogel, Textbook of Practical Organic Chemistry, 4th edition, 415 (1978).

Step B6

The preparation of 1-(trans-4'-alkylcyclohexyl)-2-(trans-4"-alkylcyclohexyl)ethanes and 1-(4'-alkylbicyclo(2',2',2')octyl)-2-(trans-4"-alkylcyclohexyl)ethanes from 4-alkylcyclohexylformaldehyde and 4-alkylbicyclo(2,2,2)octyl formaldehyde respectively.

To the Grignard reagent (prepared in a conventional manner—see Step C1 above) of the required trans-4-alkylcyclohexylmethyl bromide (0.1 mole)—(prepared according to Steps A2–B2 of Example 2)—is added dropwise, with stirring, a solution of the trans-4-alkylcyclohexylformaldehyde or 4-alkylbicyclo(2,2,2)octylformaldehyde (0.1 mole) in dry ether (35 cm$^3$). The reaction mixture is heated under reflux for 2 hr and the product is then hydrolysed, after cooling, by the addition of ice (20 g). Hydrochloric acid (10% aqueous) is added to dissolve the precipitate formed and the organic phase is separated, washed with water (3×80 cm$^3$), and dried (Na$_2$SO$_4$). The solvent is removed in vacuo and the residue heated under reflux with 4-toluenesulphonic acid (0.5 g) in toluene (200 cm$^3$) until water is no longer given off. After cooling, the toluene solution is washed with 5% aqueous sodium hydrogen carbonate solution and water (3×80 cm$^3$). The solution is dried (Na$_2$SO$_4$), the solvent removed in vacuo, and the product is crystallised from ethanol.

Step C6

The preparation of 1-(trans-4'-alkylcyclohexyl)-2-(trans-4"-alkylcyclohexyl)ethanes and 1-(4'-alkylbicyclo(2',2',2')octyl)-2-(trans-4"-alkylcyclohexyl)ethanes from 1-(trans-4'-alkylcyclohexyl)-2-(trans-4"-alkylcyclohexyl)ethanes and 1-(4'-alkylbicyclo(2',2',2')octyl)-2-(trans-4"-alkylcyclohexyl)ethanes respectively.

To a suspension of palladium/carbon (1 g, 5% Pd) in toluene (200 cm$^3$) and the required 1-(trans-4'-alkylcyclohexyl)-2-(trans-4"-alkylcyclohexyl)ethane or 1-(4'-alkylbicyclo(2',2',2')octyl)-2-(trans-4"-alkylcyclohexyl)ethane is introduced a steady stream of hydrogen at room temperature until no more hydrogen is absorbed. The catalyst is filtered off, the solvent removed in vacuo from the filtrate, and the 1-(trans-4'-alkylcyclohexyl)-2-(trans-4"-alkylcyclohexyl)ethane or 1-(4'-alkylbicyclo(2',2', 2')octyl)-2-(trans-4"-alkylcyclohexyl)ethane is crystallised from ethanol.

Examples of such products of the form

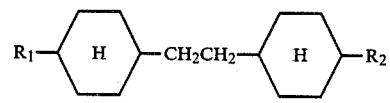

are as follows:

| $R_1$ | $R_2$ | C—S$_B$ (°C.) | S$_B$—I (°C.) | N—I (°C.) |
|---|---|---|---|---|
| n-C$_3$H$_7$ | n-C$_3$H$_7$ | 36 | 71 | [60] |
| n-C$_5$H$_{11}$ | n-C$_5$H$_{11}$ | 46 | 108 | [74] |

-continued

| $R_1$ | $R_2$ | $C-S_B$ (°C.) | $S_B-I$ (°C.) | $N-I$ (°C.) |
|---|---|---|---|---|
| n-$C_6H_{13}$ | n-$C_6H_{13}$ | 46 | 113 | [70] |

EXAMPLE 7

This example describes the preparation of 1-(4'-alkylbicyclo(2',2',2')octyl-2-(4''-alkylbicyclo(2'',2'',2'')octyl)ethanes by the following route:

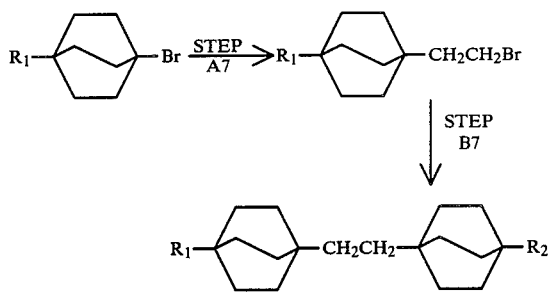

where $R_1$ and $R_2$ are alkyl groups as defined above.

Step A7

The production of 2-(4'-alkylbicyclo(2',2',2')octyl)ethyl bromides.

Step B7

The production of 1-(4''-alkylbicyclo(2',2',2')octyl)-2-(4''-alkylbicyclo(2'',2'', 2'')octyl)ethanes.

Step A7

The production of 2-(4'-alkylbicyclo(2',2',2')octyl)ethyl bromides from the known 4-alkylbicyclo(2,2,2)octyl bromides.

This step may be carried out essentially by the method used by Louis F. Fieser, Musa S. Nazer, S. Archer, D. A. Berberian, and R. G. Slighter, as described in J. Med. Chem., 10, 517 (1967) using a 1-bromoadamantane.

Step B7

The production of 1-(4'-alkylbicyclo(2',2',2')octyl)-2-(4''-alkylbicyclo(2'', 2'',2'')octyl)ethanes from 2-(4'-alkylbicyclo(2',2',2')octyl)ethyl bromide.

A solution of 2-(4'-alkylbicyclo(2',2',2')octyl)ethyl bromide (0.05 mole) in ether (35 cm³) is added slowly to lithium shavings (0.05 g atom) in ether (35 cm³), under nitrogen, at such a rate that the ether boils gently. After the addition, the mixture is heated under reflux for 1 hr and then cooled.

The 2-(4'-alkylbicyclo(2',2',2')octyl)ethyl lithium is added dropwise to a cooled (cardice/acetone), stirred, suspension of copper(I) iodide (0.05 mole) in dry tetrahydrofuran (100 cm³). The solution is stirred at −78° C. for 1 hr, then at 0° C. for a further 2 hr. The product is hydrolysed by pouring it carefully into dilute hydrochloric acid (100 cm³). The organic layer is separated and the aqueous phase shaken with ether (2×80 cm³). The combined organic phases are washed with water (3×80 cm³) and dried (MgSO₄). The solvent is removed in vacuo and the product crystallised from ethanol.

For compounds having the following structures prepared by the methods of the above examples (the particular example being given after the structure) examples of various individual compounds having the structure are as given by the various combinations of $R_1$, $R_2$ and X in Table 1 below.

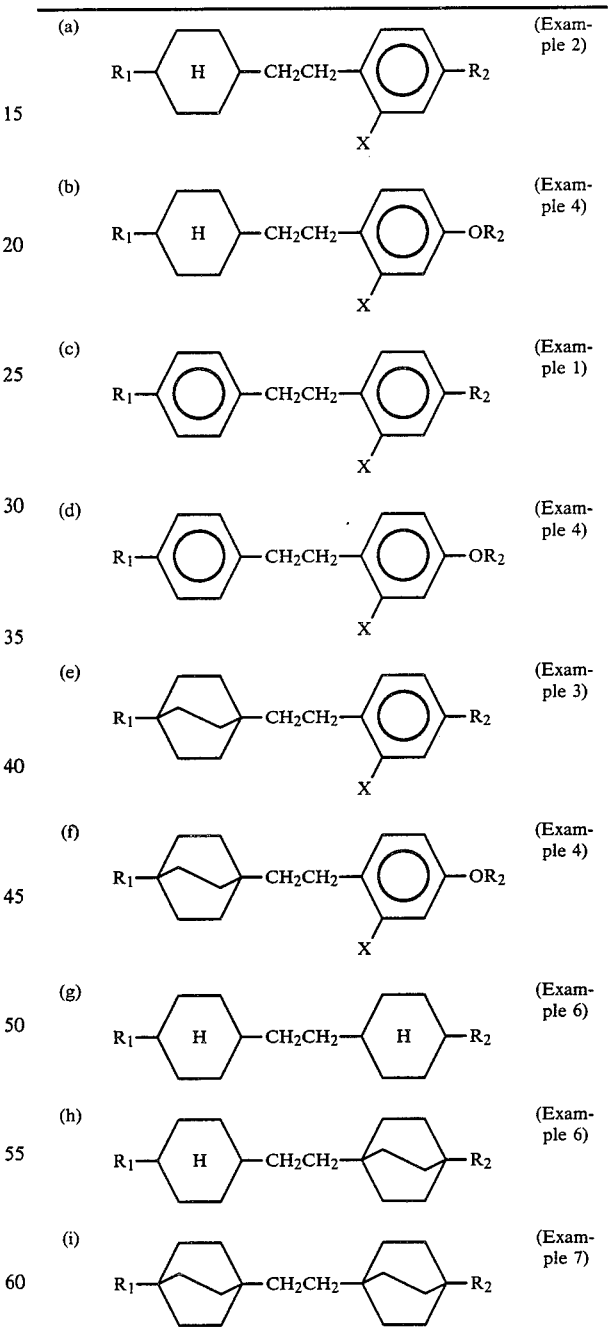

TABLE 1

| Individual compounds of the structures (a) to (g) above. | | | | | |
|---|---|---|---|---|---|
| $R_1$ | $R_2$ | X | $R_1$ | $R_2$ | X |
| $CH_3$ | $CH_3$ | H | n-$C_3H_7$ | $CH_3$ | H |

TABLE 1-continued

Individual compounds of the structures (a) to (g) above.

| | | | | | | | |
|---|---|---|---|---|---|---|---|
| CH$_3$ | C$_2$H$_5$ | } | F H | n-C$_3$H$_7$ | C$_2$H$_5$ | } | F H |
| CH$_3$ | n-C$_3$H$_7$ | } | F H | n-C$_3$H$_7$ | n-C$_3$H$_7$ | } | F H |
| CH$_3$ | n-C$_4$H$_9$ | } | F H | n-C$_3$H$_7$ | n-C$_4$H$_9$ | } | F H |
| CH$_3$ | n-C$_5$H$_{11}$ | } | F H | n-C$_3$H$_7$ | n-C$_5$H$_{11}$ | } | F H |
| CH$_3$ | n-C$_6$H$_{13}$ | } | F H | n-C$_3$H$_7$ | n-C$_6$H$_{13}$ | } | F H |
| CH$_3$ | n-C$_7$H$_{15}$ | } | F H | n-C$_3$H$_7$ | n-C$_7$H$_{15}$ | } | F H |
| CH$_3$ | n-C$_8$H$_{17}$ | } | F H | n-C$_3$H$_7$ | n-C$_8$H$_{17}$ | } | F H |
| CH$_3$ | n-C$_9$H$_{19}$ | } | F H | n-C$_3$H$_7$ | n-C$_9$H$_{19}$ | } | F H |
| CH$_3$ | n-C$_{10}$H$_{21}$ | } | F H | n-C$_3$H$_7$ | n-C$_{10}$H$_{21}$ | } | F H |
| CH$_3$ | n-C$_{11}$H$_{23}$ | } | F H | n-C$_3$H$_7$ | n-C$_{11}$H$_{23}$ | } | F H |
| CH$_3$ | n-C$_{12}$H$_{25}$ | } | F H | n-C$_3$H$_7$ | n-C$_{12}$H$_{25}$ | } | F H |
| CH$_3$ | CH$_3$.CH(CH$_3$)(CH$_2$)$_n$ n = 0 or integer from 1 to 9 | } | F H | n-C$_3$H$_7$ | CH$_3$CH(CH$_3$(CH$_2$)$_n$ n = 0 or integer from 1 to 9 | } | F H |
| C$_2$H$_5$ | CH$_3$ | } | F H | n-C$_4$H$_9$ | CH$_3$ | } | F H |
| C$_2$H$_5$ | C$_2$H$_5$ | } | F H | n-C$_4$H$_9$ | C$_2$H$_5$ | } | F H |
| C$_2$H$_5$ | n-C$_3$H$_7$ | } | F H | n-C$_4$H$_9$ | n-C$_3$H$_7$ | } | F H |
| C$_2$H$_5$ | n-C$_4$H$_9$ | } | F H | n-C$_4$H$_9$ | n-C$_4$H$_9$ | } | F H |
| C$_2$H$_5$ | n-C$_5$H$_{11}$ | } | F H | n-C$_4$H$_9$ | n-C$_5$H$_{11}$ | } | F H |
| C$_2$H$_5$ | n-C$_6$H$_{13}$ | } | F H | n-C$_4$H$_9$ | n-C$_6$H$_{13}$ | } | F H |
| C$_2$H$_5$ | n-C$_7$H$_{15}$ | } | F H | n-C$_7$H$_{15}$ | n-C$_7$H$_{15}$ | } | F H |
| C$_2$H$_5$ | n-C$_8$H$_{17}$ | } | F H | n-C$_4$H$_9$ | n-C$_8$H$_{17}$ | } | F H |
| C$_2$H$_5$ | n-C$_9$H$_{19}$ | } | F H | n-C$_4$H$_9$ | n-C$_9$H$_{19}$ | } | F H |
| C$_2$H$_5$ | n-C$_{10}$H$_{21}$ | } | F H | n-C$_4$H$_9$ | n-C$_{10}$H$_{21}$ | } | F H |
| C$_2$H$_5$ | n-C$_{11}$H$_{23}$ | } | F H | n-C$_4$H$_9$ | n-C$_{11}$H$_{23}$ | } | F H |
| C$_2$H$_5$ | n-C$_{12}$H$_{25}$ | } | F H | n-C$_4$H$_9$ | n-C$_{12}$H$_{25}$ | } | F H |
| C$_2$H$_5$ | CH$_3$CH(CH$_3$)(CH$_2$)$_n$ n = 0 or integer from 1 to 9 | } | F H | n-C$_4$H$_9$ | CH$_3$CH(CH$_3$)(CH$_2$)$_n$ n = 0 or integer from 1 to 9 | } | F H |
| n-C$_5$H$_{11}$ | CH$_3$ | } | F H | n-C$_7$H$_{15}$ | CH$_3$ | } | F H |
| n-C$_5$H$_{11}$ | C$_2$H$_5$ | } | F H | n-C$_7$H$_{15}$ | C$_2$H$_5$ | } | F H |

TABLE 1-continued
Individual compounds of the structures (a) to (g) above.

| | | | | | | |
|---|---|---|---|---|---|---|
| n-C$_5$H$_{11}$ | n-C$_3$H$_7$ | } | F H | n-C$_7$H$_{15}$ | C$_3$H$_7$ | } F H |
| n-C$_5$H$_{11}$ | n-C$_4$H$_9$ | } | F H | n-C$_7$H$_{15}$ | C$_4$H$_9$ | } F H |
| n-C$_5$H$_{11}$ | n-C$_5$H$_{11}$ | } | F H | n-C$_7$H$_{15}$ | C$_5$H$_{11}$ | } F H |
| n-C$_5$H$_{11}$ | n-C$_6$H$_{13}$ | } | F H | n-C$_7$H$_{15}$ | C$_6$H$_{13}$ | } F H |
| n-C$_5$H$_{11}$ | n-C$_7$H$_{15}$ | } | F H | n-C$_7$H$_{15}$ | C$_7$H$_{15}$ | } F H |
| n-C$_5$H$_{11}$ | n-C$_8$H$_{17}$ | } | F H | n-C$_7$H$_{15}$ | C$_8$H$_{17}$ | } F H |
| n-C$_5$H$_{11}$ | n-C$_9$H$_{19}$ | } | F H | n-C$_7$H$_{15}$ | C$_9$H$_{19}$ | } F H |
| n-C$_5$H$_{11}$ | n-C$_{10}$H$_{21}$ | } | F H | n-C$_7$H$_{15}$ | C$_{10}$H$_{21}$ | } F H |
| n-C$_5$H$_{11}$ | n-C$_{11}$H$_{23}$ | } | F H | n-C$_7$H$_{15}$ | C$_{11}$H$_{23}$ | } F H |
| n-C$_5$H$_{11}$ | n-C$_{13}$H$_{27}$ | } | F H | n-C$_7$H$_{15}$ | C$_{12}$H$_{25}$ | } F H |
| n-C$_5$H$_{11}$ | n-C$_{12}$H$_{25}$ | } | F H | n-C$_7$H$_{15}$ | CH$_3$CH(CH$_3$)(CH$_2$)$_n$ n = 0 or integer from 1 to 9 | } F H |
| n-C$_5$H$_{11}$ | CH$_3$CH(CH$_3$)(CH$_2$)$_n$ n = 0 integer from 1 to 9 | } | F H | | | |
| n-C$_6$H$_{13}$ | CH$_3$ | } | F H | n-C$_8$H$_{17}$ | CH$_3$ | } F H |
| n-C$_6$H$_{13}$ | C$_2$H$_5$ | } | F H | n-C$_8$H$_{17}$ | C$_2$H$_5$ | } F H |
| n-C$_6$H$_{13}$ | C$_3$H$_7$ | } | F H | n-C$_8$H$_{17}$ | C$_3$H$_7$ | } F H |
| n-C$_6$H$_{13}$ | C$_4$H$_9$ | } | F H | n-C$_8$H$_{17}$ | C$_4$H$_9$ | } F H |
| n-C$_6$H$_{13}$ | C$_5$H$_{11}$ | } | F H | n-C$_8$H$_{17}$ | C$_5$H$_{11}$ | } F H |
| n-C$_6$H$_{13}$ | C$_6$H$_{13}$ | } | F H | n-C$_8$H$_{17}$ | C$_6$H$_{13}$ | } F H |
| n-C$_6$H$_{13}$ | C$_7$H$_{15}$ | } | F H | n-C$_8$H$_{17}$ | C$_7$H$_{15}$ | } F H |
| n-C$_6$H$_{13}$ | C$_8$H$_{17}$ | } | F H | n-C$_8$H$_{17}$ | C$_8$H$_{17}$ | } F H |
| n-C$_6$H$_{13}$ | C$_9$H$_{19}$ | } | F H | n-C$_8$H$_{17}$ | C$_9$H$_{19}$ | } F H |
| n-C$_6$H$_{13}$ | C$_{10}$H$_{21}$ | } | F H | n-C$_8$H$_{17}$ | C$_{10}$H$_{21}$ | } F H |
| n-C$_6$H$_{13}$ | C$_{11}$H$_{23}$ | } | F H | n-C$_8$H$_{17}$ | C$_{11}$H$_{23}$ | } F H |
| n-C$_6$H$_{13}$ | C$_{12}$H$_{25}$ | } | F H | n-C$_8$H$_{17}$ | C$_{12}$H$_{25}$ | } F H |
| n-C$_6$H$_{13}$ | CH$_3$CH(CH$_3$)(CH$_2$)$_n$ n = 0 or integer from 1 to 9 | } | F H | n-C$_8$H$_{17}$ | CH$_3$CH(CH$_3$)(CH$_2$)$_n$ n = 0 or integer from 1 to 9 | } F H |
| n-C$_9$H$_{19}$ | CH$_3$ | } | F H | n-C$_{11}$H$_{23}$ | CH$_3$ | } F H |
| n-C$_9$H$_{19}$ | C$_2$H$_5$ | | H | n-C$_{11}$H$_{23}$ | C$_2$H$_5$ | H |

TABLE 1-continued

Individual compounds of the structures (a) to (g) above.

| | | | | | | |
|---|---|---|---|---|---|---|
| n-C$_9$H$_{19}$ | n-C$_3$H$_7$ | } | F H | n-C$_{11}$H$_{23}$ | n-C$_3$H$_7$ | } F H |
| n-C$_9$H$_{19}$ | n-C$_4$H$_9$ | } | F H | n-C$_{11}$H$_{23}$ | n-C$_4$H$_9$ | } F H |
| n-C$_9$H$_{19}$ | n-C$_5$H$_{11}$ | } | F H | n-C$_{11}$H$_{23}$ | n-C$_5$H$_{11}$ | } F H |
| n-C$_9$H$_{19}$ | n-C$_6$H$_{13}$ | } | F H | n-C$_{11}$H$_{23}$ | n-C$_6$H$_{13}$ | } F H |
| n-C$_9$H$_{19}$ | n-C$_7$H$_{15}$ | } | F H | n-C$_{11}$H$_{23}$ | n-C$_7$H$_{15}$ | } F H |
| n-C$_9$H$_{19}$ | n-C$_8$H$_{17}$ | } | F H | n-C$_{11}$H$_{23}$ | n-C$_8$H$_{17}$ | } F H |
| n-C$_9$H$_{19}$ | n-C$_9$H$_{19}$ | } | F H | n-C$_{11}$H$_{23}$ | n-C$_9$H$_{19}$ | } F H |
| n-C$_9$H$_{19}$ | n-C$_{10}$H$_{21}$ | } | F H | n-C$_{11}$H$_{23}$ | n-C$_{10}$H$_{21}$ | } F H |
| n-C$_9$H$_{19}$ | n-C$_{11}$H$_{23}$ | } | F H | n-C$_{11}$H$_{23}$ | n-C$_{11}$H$_{23}$ | } F H |
| n-C$_9$H$_{19}$ | n-C$_{12}$H$_{25}$ | } | F H | n-C$_{11}$H$_{23}$ | n-C$_{12}$H$_{25}$ | } F H |
| n-C$_9$H$_{19}$ | CH$_3$CH(CH$_3$)(CH$_2$)$_n$ n = 0 or integer from 1 to 9 | } | F H F | n-C$_{11}$H$_{23}$ | CH$_3$CH(CH$_3$)(CH$_2$)$_n$ n = 0 or integer from 1 to 9 | } F H F |
| n-C$_{10}$H$_{21}$ | CH$_3$ | } | F H | n-C$_{12}$H$_{25}$ | CH$_3$ | } F H |
| n-C$_{10}$H$_{21}$ | C$_2$H$_5$ | } | F H | n-C$_{12}$H$_{25}$ | C$_2$H$_5$ | } F H |
| n-C$_{10}$H$_{21}$ | C$_3$H$_7$ | } | F H | n-C$_{12}$H$_{25}$ | C$_3$H$_7$ | } F H |
| n-C$_{10}$H$_{21}$ | C$_4$H$_9$ | } | F H | n-C$_{12}$H$_{25}$ | C$_4$H$_9$ | } F H |
| n-C$_{10}$H$_{21}$ | C$_5$H$_{11}$ | } | F H | n-C$_{12}$H$_{25}$ | C$_5$H$_{11}$ | } F H |
| n-C$_{10}$H$_{21}$ | C$_6$H$_{13}$ | } | F H | n-C$_{12}$H$_{25}$ | C$_6$H$_{13}$ | } F H |
| n-C$_{10}$H$_{21}$ | C$_7$H$_{15}$ | } | F H | n-C$_{12}$H$_{25}$ | C$_7$H$_{15}$ | } F H |
| n-C$_{10}$H$_{21}$ | C$_8$H$_{17}$ | } | F H | n-C$_{12}$H$_{25}$ | C$_8$H$_{17}$ | } F H |
| n-C$_{10}$H$_{21}$ | C$_9$H$_{19}$ | } | F H | n-C$_{12}$H$_{25}$ | C$_9$H$_{19}$ | } F H |
| n-C$_{10}$H$_{21}$ | C$_{10}$H$_{21}$ | } | F H | n-C$_{12}$H$_{25}$ | C$_{10}$H$_{21}$ | } F H |
| n-C$_{10}$H$_{21}$ | C$_{11}$H$_{23}$ | } | F H | n-C$_{12}$H$_{25}$ | C$_{11}$H$_{23}$ | } F H |
| n-C$_{10}$H$_{21}$ | C$_{12}$H$_{25}$ | } | F H | n-C$_{12}$H$_{25}$ | C$_{12}$H$_{25}$ | } F H |
| n-C$_{10}$H$_{21}$ | CH$_3$CH(CH$_3$)(CH$_2$)$_n$ n = 0 or integer from 1 to 9 | } | F H F | n-C$_{12}$H$_{25}$ | CH$_3$CH(CH$_3$)(CH$_2$)$_n$ n = 0 or integer from 1 to 9 | } F H F |

TABLE 1-continued

Individual compounds of the structures (a) to (g) above.

| $R_1$ | $R_2$ | X |
|---|---|---|
| | $CH_3$ | H, F |
| | $C_2H_5$ | H, F |
| | $n-C_3H_7$ | H, F |
| | $n-C_4H_9$ | H, F |
| | $n-C_5H_{11}$ | H, F |
| $CH_3CH(CH_3)(CH_2)_n$ $n = 0$ or integer from 1 to 9 | $n-C_6H_{13}$ | H, F |
| | $n-C_7H_{15}$ | H, F |
| | $n-C_8H_{17}$ | H, F |
| | $n-C_9H_{19}$ | H, F |
| | $n-C_{10}H_{21}$ | H, F |
| | $n-C_{11}H_{23}$ | H, F |
| | $n-C_{12}H_{25}$ | H, F |
| | $CH_3CH(CH_3)(CH_2)_n$ $n = 0$ or integer from 1 to 9 | H, F |

Examples of materials and devices embodying the invention (in the second and third aspects above) will now be described by way of example only with reference to the accompanying drawings wherein.

Figure 1:
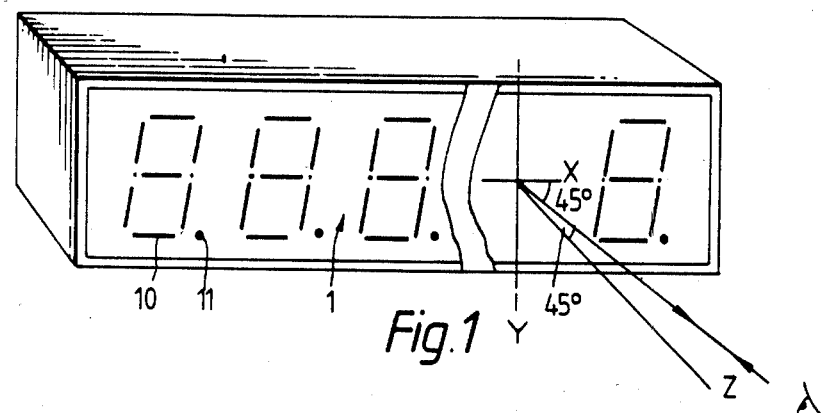
FIG. 1 is a sectional view of a twisted nematic digital display.
Figure 2:
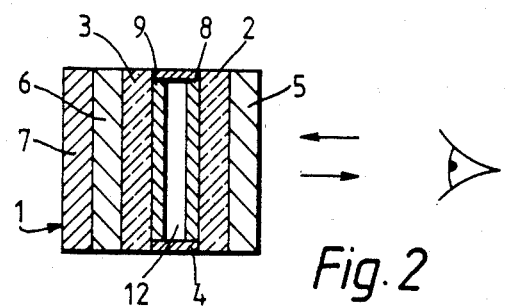
FIG. 2 is a sectional view of the display shown in FIG. 1.

The display of FIGS. 1 to 4 comprises a cell 1, formed of two, front and back, glass slides 2, 3 respectively, spaced about 7 μm apart by a spacer 4 all held together by an epoxy resin glue. A liquid crystal material 12 fills the gap between the slides 2, 3 and the spacer 4. In front of the front glass slide 2 is a front polariser 5 arranged with its axis of polarisation axis horizontal. A reflector 7 is arranged behind the slide 3. A rear polariser 6 or analyser is arranged between the slide 3 and reflector 7.

Figure 3:
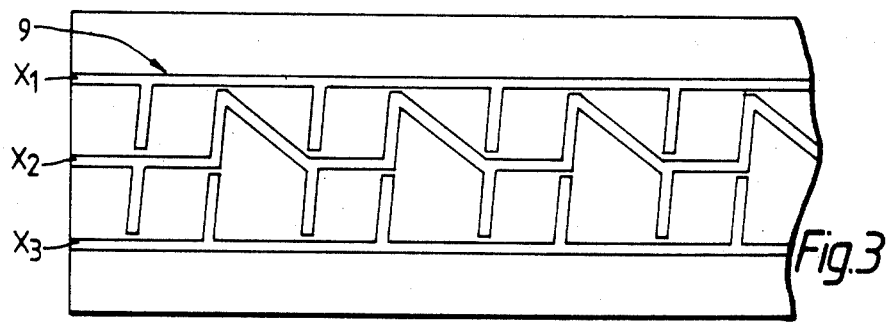
FIG. 3 shows a rear electrode configuration for FIG. 1.
Figure 4:
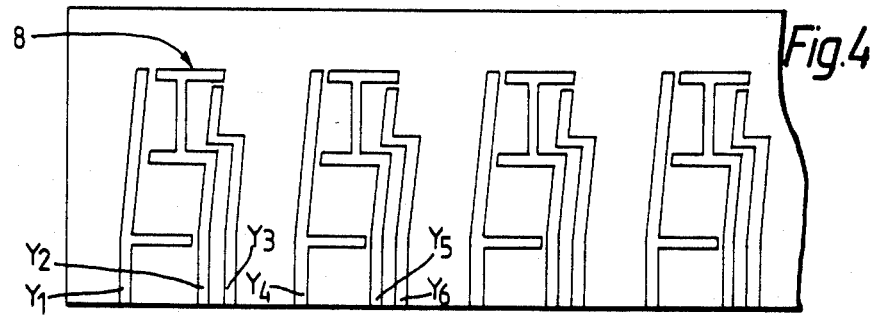
FIG. 4 shows a front electrode configuration for FIG. 1.

Electrodes 8, 9 of tin oxide typically 100 Å thick are deposited on the inner faces of the slides 2, 3 as a complete layer and etched to the shapes shown in FIGS. 3, 4. The display has seven bars per digit 10 plus a decimal point 11 between each digit.

As shown in FIG. 3 the rear electrode structure is formed into three electrodes $x_1$, $x_2$, $x_3$. Similarly the front electrode structure is formed into three electrodes per digit and decimal point $y_1$, $y_2$, $y_3$ . . . . Examination of the six electrodes per digit shows that each of the eight elements can independently have a voltage applied thereto by application of suitable voltage to appropriate x, y electrodes.

Prior to assembly the slides 2, 3 bearing the electrodes are cleaned then dipped in a solution of 0.2% by weight of poly-vinyl alcohol (PVA) in water. When dry, the slides are rubbed in a single direction with a soft tissue then assembled with the rubbing directions orthogonal to one another and parallel to the optical axis of the respective adjacent polarisers, ie so that the polarisers are crossed. When the nematic liquid crystal material 12 is introduced between the slides 2, 3 the molecules at the slide surfaces lie along the respective rubbing directions with a progressive twist between the slides.

When zero voltage is applied to the cell 1 light passes through the front polariser 5, through the cell 1 (whilst having its plane of polarisation rotated 90°) through its rear polariser 6 to the reflector 7 where it is reflected back again to an observer (shown in FIG. 1 at an angle of 45° to the axis Z normal to axes X and Y in the plane of the slides 2, 3). When a voltage above a threshold value is applied between two electrodes 8, 9 the liquid crystal layer 12 loses its optical activity, the molecules being re-arranged to lie perpendicular to the slides 2, 3, ie along the axis Z. Thus light at the position does not reach the reflector 7 and does not reflect back to the observer who sees a dark display of one or more bars of a digit 10.

Figure 5:
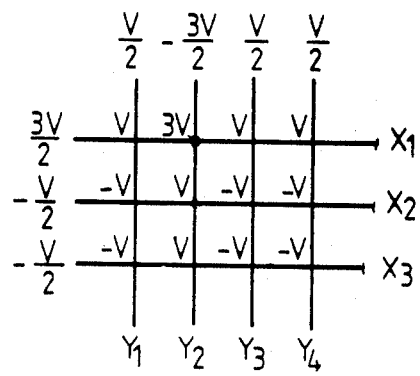
FIGS. 5, 6, 7 show schematic views of the device of FIGS. 1 to 4 with typical addressing voltages.
Figure 6:
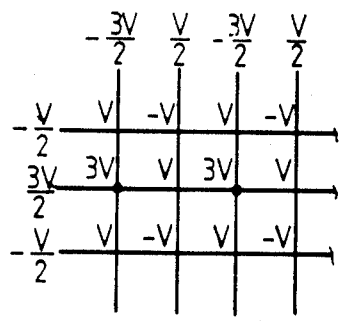
Figure 7:
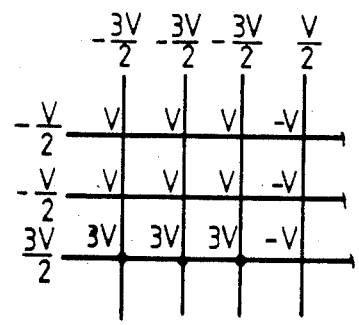

Voltages are applied as follows as shown in FIGS. 5, 6 and 7 for three successive time intervals in a linescan fashion. An electrical potential of 3 V/2 is applied to, ie scanned down, each x electrode in turn whilst $-V/2$ is applied to the remaining x electrodes. Meanwhile $-3 V/2$ or V/2 is applied to the y electrodes. A coincidence of 3 V/2 and $-3 V/2$ at an intersection results in a voltage 3 V across the liquid crystal layer 12. Elsewhere the voltage is V or $-V$. Thus by applying $-3 V/2$ to appropriate y electrodes as 3 V/2 is scanned down the x electrodes selected intersections are turned ON as indicated by solid circles. The electric voltage V is an ac signal of eg 100 Hz square wave, and the sign indicates the phase.

It will be apparent to those skilled in the art that the device shown in FIGS. 1 to 7 is a multiplexed display because the electrodes are shared between ON and OFF intersections or display elements.

A material embodying the second aspect of the invention which is suitable for use as the material 12 in the above device is in Table 3 as follows (Mixture 1).

TABLE 3

| Mixture 1 | |
|---|---|
| Compound | Weight percentage |
| C₂H₅—⟨○⟩—⟨○⟩—CN | 15 |
| n-C₄H₉—⟨○⟩—⟨○⟩—CN | 23 |
| C₂H₅—⟨H⟩—COO—⟨○⟩—⟨○⟩—CN | 12 |
| n-C₅H₁₁—⟨H⟩—⟨○⟩—⟨○⟩—CN | 10 |
| n-C₅H₁₁—⟨H⟩—CH₂CH₂—⟨○⟩—C₃H₇—n | 20 |
| n-C₅H₁₁—⟨H⟩—CH₂CH₂—⟨○⟩—OC₂H₅ | 20 |

Small amounts of a cholesteric material may be added to the nematic material to induce a preferred twist in the molecules in the liquid crystal layer. This and the use of appropriate slide surface treatment removes the problems of display patchiness as taught in UK Patent Ser. Nos. 1,472,247 and 1,478,592.

Suitable cholesteric materials are:
C 15 about 0.1–0.5% by weight and CB 15 about 0.01% to 0.05% by weight.

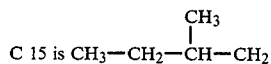

C 15 is $CH_3-CH_2-\underset{\underset{CH_3}{|}}{CH}-CH_2$

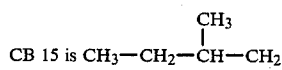

CB 15 is $CH_3-CH_2-\underset{\underset{CH_3}{|}}{CH}-CH_2$

Small amounts of pleochroic dye may be added to enhance the display contrast, eg one of the anthraquinone dyes described in UK Patent Specification No 2011940A.

Another mixture which may be used as an alternative to Mixture 1 is as follows:

TABLE 4

| Mixture 2 | |
|---|---|
| Compound | Weight percentage |
| ZLI 1289 | 70% |
| n-C₅H₁₁—⟨H⟩—CH₂CH₂—⟨○⟩—OC₂H₅ | 30% |

ZLI 1289 is a commercially available mixture of cyanobiphenyl and cyanophenyl cyclohexane compounds.

The following properties have been obtained with Mixture 2:
N-I=58° C.
Threshold voltage at 20° C.=1.10 volts.=(V₉₀(45°)*
$M_{20}$*=1.80
$M'_{20}$*=1.37
1/V (ΔV/ΔT)*=0.61 0°→40° C.
Rise time to 3 volts at 20° C.=45 msec.
Decay time from 3 volts at 20° C.=35 msec.
Rise time to 3 volts at 0° C.=150 msec.
Decay time from 3 volts at 0° C.=35 msec.
*These parameters are as defined in UK Patent Application Nos. 8031247 and 8005352.

In another embodiment mixtures embodying the second aspect of the invention may be used in a Freedericksz effect cell. Such a cell may be constructed by sandwiching the liquid crystal material between glass slides having electrode films deposited on their inner surfaces as in the above device. However, in this case the polarisers are not necessary; the glass slide inner surfaces are treated with a coating of lecithin and the liquid crystal material is a negative material whose molecules are aligned in the OFF state perpendicular to the slide substrates (homeotropic texture) by the lecithin coating. Application of an appropriate electric field across the material in the ON state re-arranges the molecules paralle to the slide surfaces (homogeneous texture). A pleochroic dye may be incorporated in the liquid crystal material to enhance the contrast between the ON and OFF states.

A Fréedericksz effect cell made in the above way may incorporate Mixture 2 below, the cell spacing being 10 m.

TABLE 5

Mixture 3

| Compound | | Weight percentage |
|---|---|---|
| ZLI 1052 | 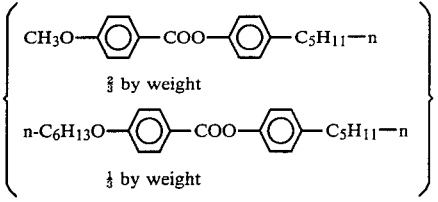 CH₃O—⌬—COO—⌬—C₅H₁₁—n  ⅔ by weight<br>n-C₆H₁₃O—⌬—COO—⌬—C₅H₁₁—n  ⅓ by weight | 50 |
| | 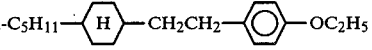 n-C₅H₁₁—⟨H⟩—CH₂CH₂—⌬—OC₂H₅ | 44 |
| Compound A | 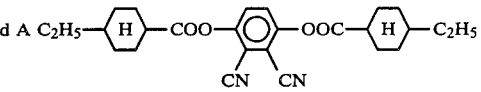 C₂H₅—⟨H⟩—COO—⌬—OOC—⟨H⟩—C₂H₅<br>         CN  CN | 6 |

The preparation of Compound A is described in UK Patent Application No. 7934129. 1.2% by weight of a known pleochroic dye eg 1,5-bis-4'-n-butyl-phenylaminoanthraquinone may be added to Mixture 2 to give a dyed mixture. (Mixture 2A)

When a voltage is applied across the cell, the colour changes from a weakly absorbing state to a strongly absorbing state.

In an alternative embodiment of the invention a (cholesteric-to-nematic) phase change effect device incorporates a material as defined above.

A cell is prepared containing a long helical pitch cholesteric material sandwiched between electrode-bearing glass slides as in the twisted nematic cell described above. However the polarisers and surface preparations for homogeneous alignment, eg treatment of the glass slide surfaces with SiO, are not used in this case.

If the glass slides are untreated and the liquid crystal material has a positive dielectric anisotropy ($\Delta\epsilon$) the liquid crystal material is in a twisted focal conic molecular texture in the OFF state which scatters light. The effect of an electric field applied between a pair of electrodes on the respective inner surface of the glass slides is to convert the region of liquid crystal material between the electrodes into the ON state which is a homeotropic nematic texture which is less scattering than the OFF state. This is a 'negative contrast' type of phase change effect device.

If the inner glass slide surfaces are treated, eg with a coating lecithin, to give alignment perpendicular to those surfaces, and the liquid crystal matrial has $\Delta\epsilon$ negative the material in the OFF state is in a homeotropic texture which has little scattering effect on incident light. If an electric field is applied between a pair of electrodes on the respective inner surfaces of the glass slides the region of liquid crystal material between the electrodes is converted to a twisted homogeneous texture which scatters light (the ON state), This is a 'positive contrast' type of phase change effect device.

The contrast between the two states in each case may be enhanced by the addition of a small amount of a suitable pleochroic dye (eg 1% by weight of 1,5-bis-4'n-butylphenylaminoanthraquinone in the case where $\Delta\epsilon$ is positive) to the liquid crystal material.

A suitable positive dielectric anisotropy material embodying the invention for use in a phase change effect device is:

TABLE 6

Mixture 4

| Material | | Weight percentage |
|---|---|---|
| Mixture B | 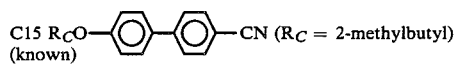 C₂H₅—⌬—⌬—CN 37.5%<br>n-C₄H₉—⌬—⌬—CN 37.5%<br>n-C₃H₇O—⌬—⌬—CN 25% | 30 |
| C15 (known) | 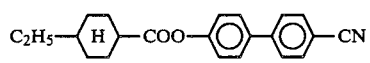 R_C O—⌬—⌬—CN (R_C = 2-methylbutyl) | (10) |
| | 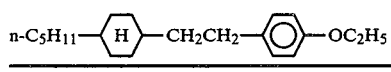 C₂H₅—⟨H⟩—COO—⌬—⌬—CN | 15 |
| | 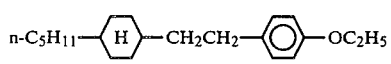 n-C₅H₁₁—⟨H⟩—CH₂CH₂—⌬—OC₂H₅ | 45 |

A suitable negative dielectric anisotropy material embodying the invention for use in a phase change effect device, Mixture 4, is as follows:

TABLE 7

Mixture 5

| Compound | Weight percentage |
|---|---|
| ZLI 1052 (see above) | 43 |
| 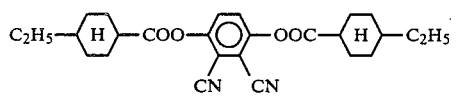 n-C₅H₁₁—⟨H⟩—CH₂CH₂—⌬—OC₂H₅ | 50 |
| C₂H₅—⟨H⟩—COO—⌬—OOC—⟨H⟩—C₂H₅<br>         CN  CN | 6 |

TABLE 7-continued

Mixture 5

| Compound | Weight percentage |
|---|---|
| —COO——$R_C$ (structure with $R_C$) | 1 |

$R_C$ = (+)-2-methylbutyl

I claim:

1. A compound suitable for use in liquid crystal material and having the formula:

$$A—CH_2.CH_2—B \qquad \text{Formula (I)}$$

where A and B are substituted ring structures, A being:

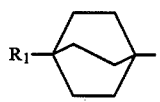

where $R_1$ is an alkyl group; and B being selected from:

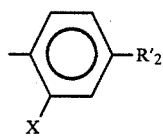

where $R'_2$ is an alkyl group $R_2$, an alkoxy group $OR_2$, an alkylcarbonyloxy group $OCO.R_2$ or an alkoxycarbonyloxy group $OCO.OR_2$; and X is hydrogen or a cyano group or a methyl group or a halogen;

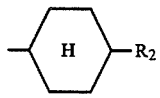

where $R_2$ is an alkyl group; or

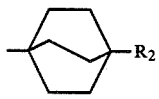

where $R_2$ is an alkyl group;

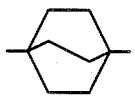

being a 1,4-disubstituted bicyclo(2,2,2)octane ring.

2. A compound as claimed in claim 1 and wherein the alkyl groups $R_1$ and $R_2$ have up to 18 carbon atoms.

3. A compound as claimed in claim 1 and wherein the alkyl groups $R_1$ and $R_2$ have ten or less carbon atoms.

4. A compound as claimed in claim 3 and wherein the alkyl groups $R_1$ and $R_2$ are n-alkyl groups.

5. A compound as claimed in claim 1 and which has the formula:

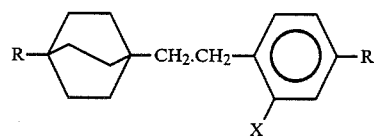

wherein each R is, independently, n-alkyl having 1 to 10 carbon atoms and X is selected from H and F.

6. A compound as claimed in claim 1 and which has the formula:

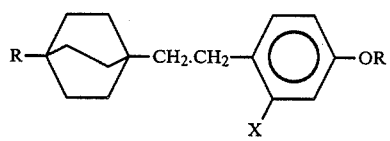

where each R is, independently, n-alkyl having from 1 to 10 carbon atoms and X is selected from H and F.

7. A compound as claimed in claim 5 and which has the formula:

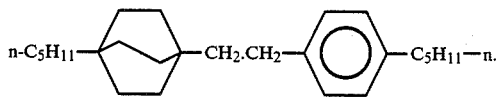

8. A compound as claimed in claim 5 and which has the formula:

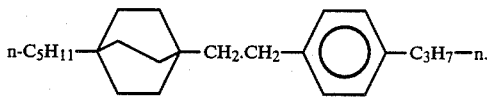

9. A compound as claimed in claim 5 and which has the formula:

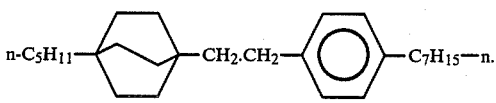

10. A compound as claimed in claim 5 and which has the formula:

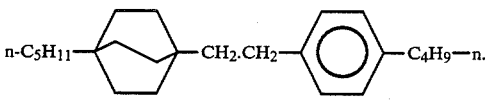

11. A compound as claimed in claim 6 and which has the formula:

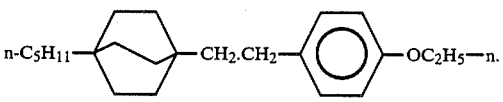

12. A compound as claimed in claim 6 and which has the formula:

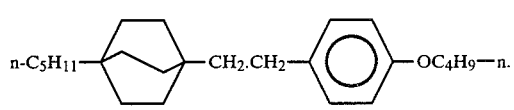
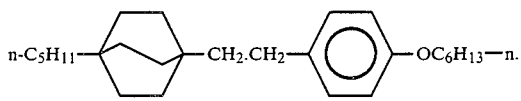
13. A compound as claimed in claim 6 and which has the formula:
* * * * *